United States Patent
Amacker et al.

(10) Patent No.: US 9,087,020 B1
(45) Date of Patent: Jul. 21, 2015

(54) MANAGING AND RETRIEVING CONTENT FROM A SHARED STORAGE

(75) Inventors: Matthew Warren Amacker, Santa Clara, CA (US); Joel D. Tesler, Cupertino, CA (US)

(73) Assignee: A9.com, Inc., Palo Alto, CA (US)

( * ) Notice: Subject to any disclaimer, the term of this patent is extended or adjusted under 35 U.S.C. 154(b) by 267 days.

(21) Appl. No.: 13/542,092

(22) Filed: Jul. 5, 2012

(51) Int. Cl.
*G06F 15/167* (2006.01)
*G06F 17/30* (2006.01)

(52) U.S. Cl.
CPC .............. *G06F 15/167* (2013.01); *G06F 17/30* (2013.01)

(58) Field of Classification Search
CPC ...... G06F 9/5061; G06F 15/167; G06F 17/30
USPC ........................................ 709/215, 214, 201
See application file for complete search history.

(56) References Cited

U.S. PATENT DOCUMENTS

| | | | |
|---|---|---|---|
| 5,850,522 A * | 12/1998 | Wlaschin | 709/215 |
| 6,026,474 A * | 2/2000 | Carter et al. | 711/202 |
| 7,346,842 B1 * | 3/2008 | Hayton et al. | 715/234 |
| 7,702,741 B2 * | 4/2010 | Yuan et al. | 709/208 |
| 7,853,952 B2 * | 12/2010 | Riddle | 718/104 |
| 2009/0024916 A1 * | 1/2009 | Burckart et al. | 715/241 |
| 2010/0057785 A1 * | 3/2010 | Khosravy et al. | 707/203 |
| 2010/0194753 A1 * | 8/2010 | Robotham et al. | 345/428 |

* cited by examiner

*Primary Examiner* — Yves Dalencourt
*Assistant Examiner* — Sahera Halim
(74) *Attorney, Agent, or Firm* — Hogan Lovells US LLP

(57) ABSTRACT

Systems and methods of managing published content of a shared storage medium can include rendering client-side script of published content at a client device. When rendering the client-side script, information from which a partition name can be computed can be transmitted to a server. The server can compute the partition name and identify a partition of the shared storage medium corresponding to the partition name. If a partition corresponds to the partition name, the server transmits data stored in that partition to the client device. If a partition does not correspond to the partition name, the server creates the partition. The server can also create message queue associated with the partition and the client device to place messages corresponding to updates to the partition. In response to a data update operation of the client-side script, the server transmits the updates in the message queue to the client device.

25 Claims, 6 Drawing Sheets

MANAGING AND RETRIEVING CONTENT FROM A SHARED STORAGE

BACKGROUND

When accessing content over the World Wide Web, a client-side device typically retrieves the content from a web-based server associated with a content provider. The client-side device renders the content to display the web content. For example, the client-side device can have a browser application stored thereon which is executable by a processor of the client-side device to communicate with a web-based name server that translates a website address into an IP Address. The browser then forms a connection to the server associated with that IP address. The browser can then send a request to the server for the content (for example, the HTML file), and the server can send the requested web content to the client-side device for rendering by the browser. The next time the browser requests the content from the same IP address, the browser can synchronize the content it retrieved from the previous request to update the content with any new information or revised content associated with the IP address or the browser can download the content again to replace the content previously retrieved from the IP address.

With respect to synchronizing and updating the content, a conventional client-side computer can locally store the content at a client-side database, which resides in the client browser. In such client-side database, data stored will be on a per browser basis. For example, if a user switches between web browser applications, different client-based databases will be utilized. With the client-based database, data stored therein will remain in the client-based database, even after the browser is closed. Therefore, the next time the browser is launched and the content is retrieved, the content can be retrieved from the client-side database and synchronized or updated with any new information or revised content from the web-based server associated with the content provider of the content. The content also can be stored in a database server. For example, the database server can be the back-end system of a database application using client/server architecture. The database server can perform tasks such as data analysis, storage, data manipulation, archiving, and other non-user specific tasks. When the client device attempts to retrieve content from the web-based server of the content provider, the content can be retrieved from a database server associated with the client device and the web-based server. The database development, determination of whether the content has been modified, and synchronization of content between the client-side device and the various servers and databases associated with the content provider can be cumbersome and can become more complicated with more complex content.

BRIEF DESCRIPTION OF THE DRAWINGS

Various embodiments in accordance with the present disclosure will be described with reference to the drawings, in which.

DETAILED DESCRIPTION

Figure 1:
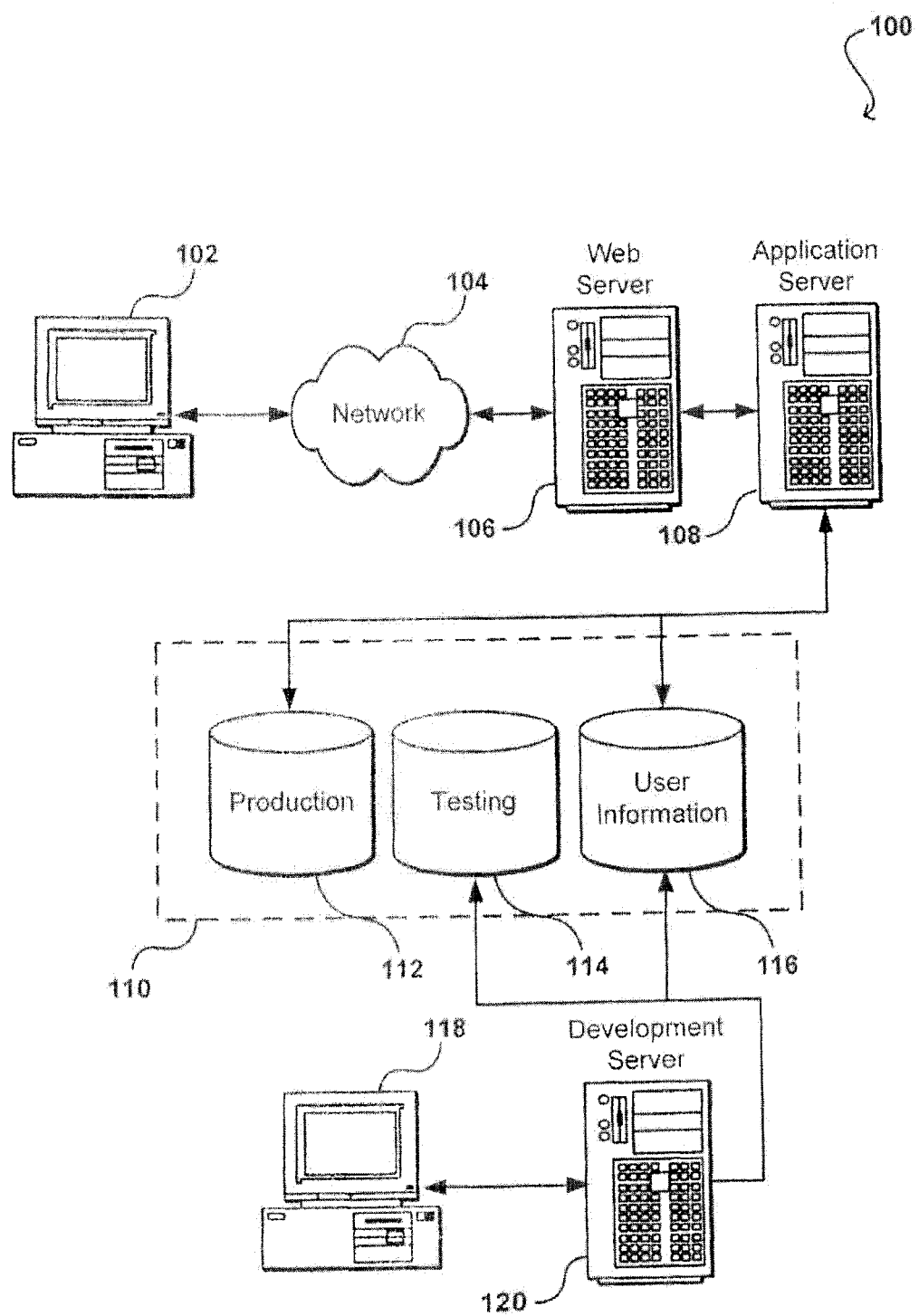
FIG. 1 illustrates a non-limiting example environment in which various embodiments can be implemented.

Systems and methods in accordance with various embodiments of the present disclosure may overcome one or more of the aforementioned and other deficiencies experienced in conventional approaches to providing content. In particular, various embodiments provide systems and methods for managing and retrieving content from a shared storage with minimal publisher interaction.

The term shared storage medium, as used herein, shall refer to a storage medium which is accessible by a plurality of client devices, content providers, content publishers and other such entities that may or may not be related to one another. The shared storage medium can be a remote or local storage medium. In one non-limiting example, a shared storage medium can be a cloud database that is accessible by a plurality of client devices and content publishers. The storage medium can be part of a remote storage system comprising multiple, distributed systems or devices. The storage medium also can be offered as a service that can rely upon a number of different data stores or other such objects. The shared storage medium can be partitioned, for example, into a plurality of partitions or peersets, where each partition or peerset (identified by a peerset name) associated with a designated group of client devices.

The term content provider or content publisher, as used herein, shall refer to a creator or host of content. For example, a content provider or content publisher can include a webpage designer, a web developer, a webpage publisher, a hypertext markup language (HTML) designer, a host of HTML content, or any other provider or publisher of content.

The term content, as used herein, shall refer to content which can be provided electronically to client devices. Content can include, but is not limited to, a webpage, an HTML document, a game, a peer-to-peer game, a web-based chat conversation, a web-based application, or any other data or information that can be electronically accessed by client devices.

A non-limiting example of managing and retrieving content from a shared storage medium can include rendering content at a browser of a client device. Rendering the content can include rendering a script tag in the browser of the client device. When the script tag is rendered, the client device can transmit data to a server. For example, the client device can request registration of the client device by the server. The server can host a database (for example, a backend database associated with the content rendered on the client device). The data can include information from which the server can determine a peerset or partition of the database that is associated with the client device. For example, the information can include a website address, a user ID (for example, a browser ID or any other unique identification string by which the client device can be identified), and a type of information. The type of information can include a domain type, an internet protocol type, a secret word type, or any other type designated by the script tag as indicating the type of a name associated with the peerset. Such information can be utilized to compute a name of a peerset or partition (for example, site_type) and a client ID (for example, site_type_userID). Based on the data transmitted by the client device, the server can create a message queue for the client device. The server can also determine whether a partition already exists for the client device based on the data transmitted by the client device. For example, the server can determine whether a partition already exists having a name that matches the site and type transmitted by the client device. If a partition already exists, the server can transmit the data contained in the partition to the client device. The data can be stored in a browser storage or client-side storage of the client device. The data can also be rendered at the client device (for example, in the browser of the client device). If, however, a partition does not already exist, the server can create the partition. The server can also associate the computed name with the partition, thereby associating the client device and any other device having at least some of the same information transmitted by the client device with the partition.

As the client device interacts and modifies the content rendered at the client device, the modifications to the content can be sent to the server. Along with the modifications, the client device, again, can send data including the information from which the server can determine which peerset or partition of the database is associated with the client device. Based on the data transmitted by the client device, the server can identify the partition associated with the client device. The server can then update the partition with the modifications of the content transmitted by the client device. The server can also send updates to other client devices listening to or associated with the partition, where the updates include the modifications to the content.

Additionally, as the client device interacts with the content, the client device can send a data check or a status request to the server to retrieve any updated or new data stored in the partition associated with the client device. The updated or new data can be data which other client devices sharing the same partition as the client device have modified or added to the partition. When the client device transmits the data check or the status request, the client device, again, can transmit data including information from which the server can determine which peerset or partition of the database is associated with the client device. Based on the information transmitted by the client device, the server can identify a message queue associated with the client device. The server can also identify the partition associated with the client device based on the information transmitted by the client. If there are any updates or data in the message queue associated with the client device, the server can send the updates or data in the message queue to the client device. If, however, there are no updates or messages in the message queue, the server can hold or maintain the connection with the client device until an update or data arrives or is placed in the message queue of the client device. When an update or data is placed in the message queue of the client device, the update or data can be sent to the client device substantially simultaneously or immediately after the update or message is placed in the message queue. As the client device renders, at the client device, a script tag embedded in content rendered on a browser of the client device, and as the server computes a partition name based on information transmitted by the client device when rendering the script tag, there is little to no interaction from the content publisher (that is, the creator of the content) to create a database for each client device that accesses or renders content published by the content publisher.

With the presently disclosed technology, the publisher can identify, in a client-side script embedded in content to be rendered at the client device, the information needed to identify or create a peerset or partition of a database associated with the content rendered at the client device (for example, a database stored in a backend server associated with the publisher's content). The client device can then render the client-side script and transmit, to a server, data containing the information specified by the script written by the publisher and embedded in the publisher's content (for example, by rendering a script key). Then, as the client device renders the content and renders the scripting language embedded in the content, the client device can send or transmit any data, modifications, or events associated with the content to a message queue associated with the peerset or partition of the server dedicated to the content rendered at the client device. Additionally, any other client device that has or is currently rendering the content and the script embedded in the content can send or transmit any data, modifications to, or events associated with the content to the message queues associated with the peerset or partition of the server dedicated to the content rendered at the other client device(s). The server can then update the peerset or partition with the data placed in the message queue in the order the data was placed in the message queue. Updating the peerset or partition in the order that the data is placed in the message queue can reduce latency problems that can occur when two client devices transmit data to the partition at the same time, as will be discussed in further detail below.

When the client device renders the content and renders the scripting language embedded in the content, the client device can also request and receive, from the server, any data, modifications to, updates to, or events associated with the content and caused, updated by or sent by other client devices that have or are currently rendering the same content That is, the client device can retrieve the most up-to-date or latest state of the content by rendering a script key of client-side script embedded in content rendered at the client device. Additionally, as the server updates the peerset or partition with data in the message queue, the server can immediately transmit the updated data to any client device currently rendering the content associated with the peerset or partition, thereby ensuring that the client devices currently rendering the content have the most up-to-date or latest state of the content. As will be described in further detail below, the present disclosure provides for an efficient and robust system and method of managing and retrieving content from a shared storage that can be implemented by rendering a client-side script with little to no publisher interaction in creating or updating a database with the various states of the publisher's content.

Detailed examples of systems and methods of managing and retrieving content from a shared storage with minimal publisher interaction will be described in relation to FIGS. 1-7.

FIG. 1 illustrates an example of an environment 100 for implementing aspects in accordance with various embodiments. As will be appreciated, although a Web-based environment is used for purposes of explanation, different environments may be used, as appropriate, to implement various embodiments. An electronic client device 102 can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a plurality of resources, servers, hosts, instances, routers, switches, data stores, and/or other such components defining what will be referred to herein as a data plane 110, although it should be understood that resources of this plane are not limited to storing and providing access to data. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides admission control services in cooperation with the data store, and is able to generate content such as text, graphics, audio, and/or video to be transferred to the user, which may be served to the user by the Web server in the form of HTML, XML, or another appropriate structured language in this example. In some embodiments, the Web server 106, application server 108 and similar components can be considered to be part of the data plane. The handling of all requests and responses, as well as the delivery of content between the client device 102 and the application server 108, can be handled by the Web server. It should be understood that the Web and application servers are not required and are merely example components, as structured code can be executed on any appropriate device or host machine as discussed elsewhere herein.

The environment also includes a development and/or testing side, which includes a user device 118 allowing a user such as a developer, data administrator, or tester to access the system. The user device 118 can be any appropriate device or machine, such as is described above with respect to the client device 102. The environment also includes a development server 120, which functions similar to the application server 108 but typically runs code during development and testing before the code is deployed and executed on the production side and is accessible to outside users, for example. In some embodiments, an application server can function as a development server, and separate production and testing storage may not be used.

The data stores of the data plane 110 can include several separate data tables, databases, or other data storage mechanisms and media for storing data relating to a particular aspect. For example, the data plane illustrated includes mechanisms for storing production data 112 and user information 116, which can be used to serve content for the production side. The data plane also is shown to include a mechanism for storing log data 114, which can be used for purposes such as reporting and analysis. It should be understood that there can be many other aspects that may need to be stored in a data store, such as for page image information and access right information, which can be stored in any of the above listed mechanisms as appropriate or in additional mechanisms in the data plane 110. The data plane 110 is operable, through logic associated therewith, to receive instructions from the application server 108 and obtain, update, or otherwise process data, instructions, or other such information in response thereto. In one example, a user might submit a search request for a certain type of item. In this case, components of the data plane might access the user information to verify the identity of the user, and access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, enable the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

An environment such as that illustrated in FIG. 1 can be useful for various content publishers or other such entities, wherein multiple hosts and various types of resources might be used to perform tasks such as serving content, authenticating users, allocating resources, or performing any of a number of other such tasks. Some of these hosts may be configured to offer similar functionality, while other servers might be configured to perform at least some different functions. The electronic environment in such cases might include additional components and/or other arrangements, than those illustrated in FIG. 1.

Figure 2:
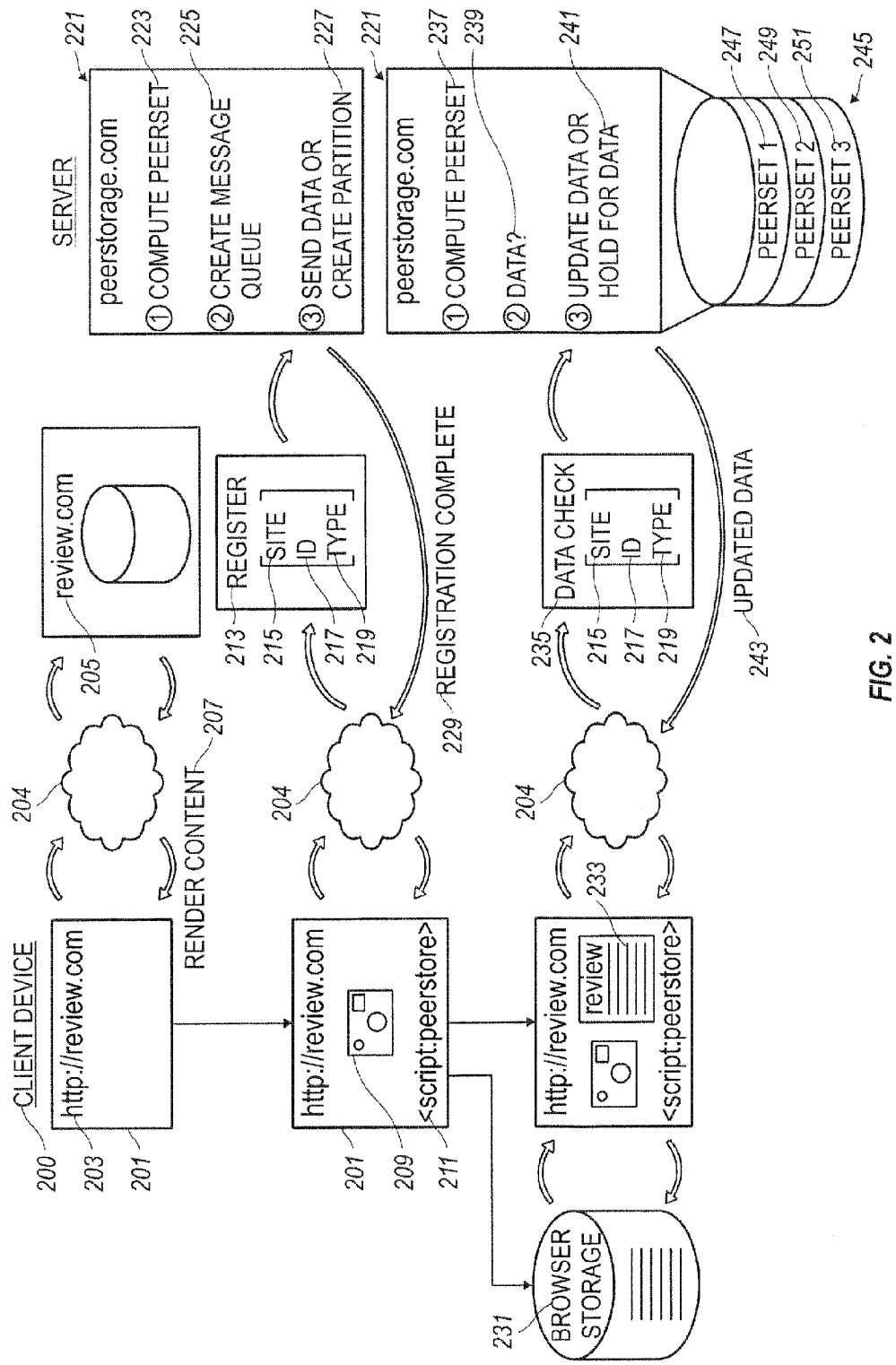
FIG. 2 illustrates a flow diagram of a non-limiting example method of managing a shared storage medium in accordance with one embodiment.

FIG. 2 illustrates a flow diagram of an example system and method of managing and retrieving content from a shared storage medium with minimal publisher interaction. In FIG. 2, a client device 200, a server 221, and a shared storage medium 245 communicatively coupled to the server 221 are illustrated. The client device 200 can be a computer, a personal computer, a cell phone, a handheld messaging device, a laptop computer, a set-top box, an electronic book reader, smartphone, a netbook, an electronic tablet, an electronic pad, a personal digital assistant (PDA), or any other similar electronic device which access data and information associated with a publisher's content stored in the shared storage medium 245.

The server 221 can be a backend server, a web-based server, a cloud-based server, a system of one or more server, or any other system which can manage data and information associated with a publisher's content. In FIG. 2, the server 221 can host the shared storage medium 245. As discussed above, the shared storage medium 245 can be storage medium shared by a plurality of client devices, a plurality of publishers, a plurality of domains, a plurality of networks, or any combination thereof. The shared storage medium 245 can be partitioned into a plurality of peersets (for example, "peerset 1" 247, "peerset 2" 249, and "peerset 3" 251), where each peerset 247, 249, 251 is associated with a respective client device, content publisher, domain, server, or any other device or entity having ownership or access to the peerset 247, 249, 251.

As illustrated in FIG. 2, the client device 200 and the server 221 can be communicatively coupled via a network 204. In FIG. 2, the network 204 is the Internet but can also be any other appropriate network such as an intranet, a cellular network, a local area network, or any other such network or combination thereof. Communication over the network can be enabled by wired or wireless connections, and combinations thereof. In FIG. 2, the network 204 includes the Internet, as the environment includes a cloud-based server 221 for receiving requests and serving content in response thereto, although for other networks an alternative device serving a similar purpose could be used as would be apparent to one of ordinary skill in the art.

In FIG. 2, the client device 200 can include a processor (not shown). The client device 200 can also include a computer readable storage medium 231 configured to store instructions which when executed by the processor control the processor to perform processes, functions, or steps for retrieving data and information from the shared storage medium 245 communicatively coupled to the server 221. As illustrated in FIG. 2, the computer readable storage medium 231 can store instructions for executing a browser application 201 by which the client device 200 can access publisher content (for example, websites, web-based applications, web-based databases, or any other content created by a publisher and made accessible to client devices by the publisher). The computer readable storage medium 231 can also include a dedicated portion for a browser storage, as illustrated in FIG. 2. The browser storage can be dedicated to store data and information associated with publisher's content accessed via a browser application 201. In other embodiments, the browser storage can be a separate storage medium.

In FIG. 2, the client device 200 has executed a browser application 201 thereon. Via the browser application 201, the client device 200 has requested access to a publisher's content that is a website 203. Specifically, in FIG. 2, the client device 200 has requested access to the website 203 having an address of "review.com." For example, a user of the client device 200 can enter, via a user input device (not shown) of the client device 200, the website address "review.com" in a graphical user interface of the web browser. In response to entering the address associated with the publisher's content, the client device 200 can request the publisher's content from a web server 205 hosting the publisher's content (the website "review.com"). The web server 205 can then transmit the publisher's content (for example, an HTML document including script) to the client device 200.

In response to receiving the publisher's content from the webserver 205, the processor of the client device 200 can render 207 the publisher's content (for example, the HTML document associated with the website 203). In FIG. 2, when the HTML document associated with the website 203 is rendered in the browser 201 of the client device 200, graphical information associated with the website 203 can be rendered and displayed at the client device 200. For example, as illustrated in FIG. 2, an image 209 can be displayed at the browser 201 of the client device 200. In FIG. 2, the image 209 is of a camera product that has been or can be reviewed on the website 203, but in other embodiments, the graphical information can include any other image, text, or other graphical representation of information.

The publisher's content can also include client-side script (for example, Javascript™ included in the publisher's content). When the client device 200 renders the publisher's content, the client device 200 can also render any client-side script included in the publisher's content. For example, the client device 200 can render the client-side script which can include a library having one or more script tags. In FIG. 2, when the client-side script is rendered, a script tag 211 can be rendered in the browser 201 of the client device 200. As illustrated in FIG. 2, when rendering the script tag 211, the client device 200 can transmit information 215, 217, 219 to the backend server 221 associated with the publisher's content 203. For example, rendering the script tag 211 can initiate a registration of the client device 200 with the backend server 221 by transmitting information 215, 217, 219 to the backend server 221. In FIG. 2, the information can include the website address 215 of the website 203, a browser identification (ID) 217, and a type 219. The browser ID 217 can be a character string comprising a combination of any one of alphabetic characters, numbers, and symbols. In one example, the browser ID 217 can be a randomly generated numeric string that is permanently assigned to the client device 200, thereby providing a character string by which other devices can definitely identify the client device 200. In other embodiments, the browser ID 217 can be a character string set or designated by a user, an administrator, or an owner of the client device 200. For example, the ID 217 can be a username that an administrator assigns to the client device 200. In other embodiments, the browser ID 217 can be permanently assigned to the browser application 201. For example, if the browser application 201 requires a username and password to access or utilize the browser application 201, the browser ID 217 can be the username required to utilize the browser application 201. In any embodiment however, the backend server 221 associated with the publisher's content 203 will be able to identify which client device requests, transmits, or both requests and transmits data from the backend server 221 based on the ID 217. The type 219 can be designated in the script of the content 203 by the publisher. In FIG. 2, the type 219 can be a domain type, a geo-subnet type, an internet protocol (IP) type, a secret word type (for example, a character string designated by the publisher or a character string, designated by the user accessing the content 203 in response to a prompt from the publisher), a geo-location type, a network address type, a geo-IP type, or any other type by which the publisher of the content 203 desires to have the server 221 identify a peerset 247, 249, 241 associated with the publisher's content 203.

In FIG. 2, when the client device 200 renders the client-side script of the publisher's content 203 (including the script tag 211) in the browser 201 of the client device 200, the client device 200 can transmit information including the site 215, ID 217, and type 219 associated with the client device's browser 201 and the client device 200 itself. The client device 200 can transmit such information to register 213 the client device 200 with the backend server 221 associated with the publisher's content 203. As illustrated in FIG. 2, the server 221 can receive the information 215, 217, 219 transmitted by the client device 200 and register the client device 200 with a peerset associated with the publisher's content corresponding to the website 203.

For example, in FIG. 2, when the server 221 registers the client device 200, the server 221 can compute 223 a name or identification string of a peerset associated with the client device 200 based on the transmitted information 215, 217, 219. In one embodiment, the server 221 can compute a peerset name based at least in part on the site 215 and the type 219 information transmitted by the client device 200. As any client device that visits, retrieves, or renders the publisher's content (for example, the website 203 "http://review.com") will transmit information having the same site 215 and type 219 (designated by the publisher in the client-side script embedded in the publisher's content), the name of the peerset associated with the publisher's content that is based on the site 215 and type 219 will be the same for each of the client devices. This thereby allows the server 221 to readily identify and associate the peerset corresponding to the computed peerset name with any client device that visits, retrieves, or renders the publisher's content that transmits the information from which the peerset name was computed. For example, in FIG. 2, the peerset name associated with the publisher's content (for example, the website 203 "http://review.com") can be computed as review.com_domain. Then, any client device that accesses, renders, or both accesses and renders the publisher's content will transmit the same site 215 and type 219 information in response to rendering the script tag 211 of client-side script of the publisher's content, and the same peerset name review.com_domain will be computed by the server 221. This can thereby indicate that each client device will receive the data and modifications stored in the peerset having the name review.com_domain. In other words, when the server 221 computes the peerset name, the server 221 can utilize the peerset name in a lookup table to determine whether a partition has been created for the computed peerset name, as will be described below. The server 221 can also determine whether any other client devices are listening or waiting for data associated with that partition (if it has been created).

Also illustrated in FIG. 2, in response to the server 221 receiving a request to register the client device 200 and in addition to computing the peerset 223, the server 221 can also compute a client identification (ID) string or a client device identifier (not shown). The client ID is specific to the client device 200. The client ID can be utilized to identify the source of any information or data received by the server 221. For example, as will be discussed in detail below, if the client device 200 modifies the website 203 (for example, by adding a review to the website 203, submitting a comment, filling out a survey, or otherwise modifying or interacting with the website 203 such that the content of the website 203 is changed) the information or data sent by the client device 200 can be tagged, marked, or otherwise associated with the computed client ID. In at least one embodiment, the server 221 can compute the client ID based on the site 215, type 219, and browser ID 217 transmitted by the client device 200. For example, the client ID can be computed by appending the peerset name with the browser ID 219. For example, in FIG. 2, the client ID can be computed as review.com_domain_browser ID. By computing the client ID with the computed peerset name, the server 221 can not only identify the peerset to associate with the client device 200 but also provide an identifier or marker to associate any information or data transmitted by the client device 200 associated with the content corresponding to the peerset.

When the server 221 computes the client ID, the server 221 can also create 225 a message queue associated with the client ID. That is, the server 221 can create 225 and assign a message queue with the client ID of the client device 200 so that the message queue is designated or dedicated for the client device 200. The message queue can store data or information transmitted by the client device 200 or store data or information to be transmitted to the client device 200 by the server 221, as will be discussed in further detail below.

After computing 223 the peerset name and creating 225 a message queue, the server 221 can determine 227 whether a partition 247, 249, 251 or peerset of the shared storage medium 245 coupled to the server 221 has been created and assigned to the computed peerset name. If a partition exists or has been created for the computed peerset, the server 221 can send or transmit the data contained in the partition to the client device 200. The data contained in the partition will be the data associated with the publisher's content 203 rendered at the browser 201 of the client device. In at least one embodiment, the server 221 can send or transmit the data contained in the partition to the client device 200 when the server 221 sends a signal to the client device 200 that the client device's registration 229 is complete.

If the server 221 determines that a partition does not exist or has not been created for the computed peerset name, the server 221 can create the partition and associate the partition with the computed peerset name. In at least one embodiment, the server 221 can transmit empty data to the client device 200 after creating the partition. For example, after the server 221 creates the partition, the server 221 can send or transmit the empty data to the client device 200 when the server 221 sends a signal to the client device 200 that the client device's registration 229 is complete.

When the server 221 completes the registration 229 of the client device 200 and sends the data contained in the partition associated with the computed peerset name, the client device 200 can store the data in the client device's browser storage 231. The data can also be rendered in the browser 201. In FIG. 2, a partition associated with the computed peerset name had been created previously, and the server 221 has transmitted at least some (for example, all) of the data contained in the partition. When the client device 200 renders the data transmitted by the server 221, text 233 that had been stored in the partition is rendered and included in the website 203 displayed in the browser 201 of the client device 200. Specifically, in FIG. 2, the text 233 is a review of the product 209 displayed on the website 203 rendered in the browser 201 of the client device 200.

As the user of the client device 200 interacts with the publisher's content (for example, the website 203) and as the script associated with the publisher's content is rendered at the client device 200, the client device 200 can send a data check call 235 to the server 221 associated with the publisher's content 203 and hosting the data associated with the publisher's content 203. The data check call 235 can be an operation or command corresponding to a request for updated information or data or a request for a current state of the publisher's content. The data check call 235 can be transmitted in response to the browser 201 rendering the client-side script (including the script tag 211 associated with the data stored at the server 221) at the client device 200. As illustrated in FIG. 2, when the client device 200 renders the script tag 211 and sends a data check call 235 to the server 221, the information 215, 217, 219 from which the server 221 can compute a peerset name can also be transmitted with the data check call 235. For example, as illustrated in FIG. 2, the information can include site 215 data, browser ID 217 data, and type 219 data, similar to the information transmitted with the request to register 213 the client device 200 with the server 221, as discussed above.

When the server 221 receives the data check call 235 that includes the information 216, 217, 219 from which the server 221 can compute a peerset name to associate with the client device 200, the server 221 can compute 237 the peerset name, similar to the computation of the peerset name described above at item 223. In FIG. 2, the server can compute 237 the peerset name using the site 215 and the type 219 data transmitted by the client device. Also similar to the computation of the peerset name described above at item 223, the server 221 can compute a client ID. Based on the computed client ID and the computed peerset name, the server 221 can identify a message queue associated with the client device 200 and the peerset of the shared storage medium 245 associated with or corresponding to the publisher's content (for example, the website 203).

After the server 221 identifies the message queue associated with the client device 200 and the peerset associated with the computed peerset name, the server 221 can determine 239 whether there is any data in the message queue associated with the computed client ID corresponding to the client device 200. As discussed above, the server 221 can store any updated data or modifications to the state of the publisher's content 203 that have been transmitted to the server 221 (for example, any events, interactions, cursor events, text inputs, or any other modifications to the state of the publisher's content 203 transmitted to the server 221 by other client devices that have rendered or are currently rendering the publisher's content 203 that is rendered at the client device's 200 browser 201). The updated data or modifications can be from other client devices currently accessing or rendering the publisher's content at substantially the same time that the client device 200 is rendering the publisher's content.

In FIG. 2, based on the server's 221 determination 239 of whether the message queue associated with the computed client ID has data stored therein, the server 221 can at least send the updated data to the client device 200 or hold the connection with the client device 200 until updated data is received by the server 221 and placed in the message queue, as indicated by the reference number 241.

In FIG. 2, the server 221 determines that data is in the message queue associated with the computed client ID associated with the client device 200. In response to determining that there is data waiting in the message queue for the client device 200, the server 221 transmits or sends 243 the updated data to the client device 200. The client device 200 can then receive the updated data and store it in the browser storage 231. The client device 200 can also render the updated data in the browser 201. For example, in FIG. 2, the updated data can be a review transmitted to the server 221 and placed in the message queue associated with the client device 200, wherein the review was transmitted to the server 221 after the client device 200 registered itself with the server 221 received and rendered the content that had been stored in the peerset corresponding to the publisher's content 203 at the time of the client device's 200 registration. When the client device 200 renders the updated data, the new review associated with the updated data can be added to or replace the review 233 that had been rendered and displayed when the client device 200 registered itself with the server 221.

In FIG. 2, as the user of the client device 200 interacts with the publisher's content 203 and renders the publisher's content 203 at the browser 201 of the client device 200, the client device 200 can continue to transmit data check calls 235 to the server 221 when the client device 200 renders commands or calls in the client-side script (for example, when rendering a script key 211 embedded in the client-side script) to request any updated data, updated states, or both updated states and updated data of the publisher's content 203 from the server 221.

As discussed above, when the client device 200 renders the client-side script that includes a script key 211 (for example, "peerstore") designated by the publisher of the content 203, the client device 200 can transmit the information 215, 217, 219 needed by the server 221 to create or identify the message queue and peerset associated with the client device 200 and the publisher's content 203 being rendered at the client device 200. As the client device 200 renders client-side script embedded in the publisher's content (for example, by rendering the script key 211 "peerstore" of the client-side script) to retrieve data and information associated with the publisher's content, the content publisher simply needs to place a script key 211 in the client-side script that will prompt the backend server 221 to identify the necessary information or data requested by the client device 200 and create or retrieve the peerset associated with the client device 200 and the publisher's content 230. That is, no additional publisher interaction is necessary to create a partition or identify a partition associated with the publisher's content 203 and the client device other than to include a script key 211 in the client-side script. The client device 200 then simply renders the client-side script in the browser 201 rendered at the client device 200. In response, the backend server 221, without interaction from the publisher, identifies or creates a partition associated with the publisher's content 203 and the client device 200 and transmits any data stored therein to the client device 200.

Figure 3:
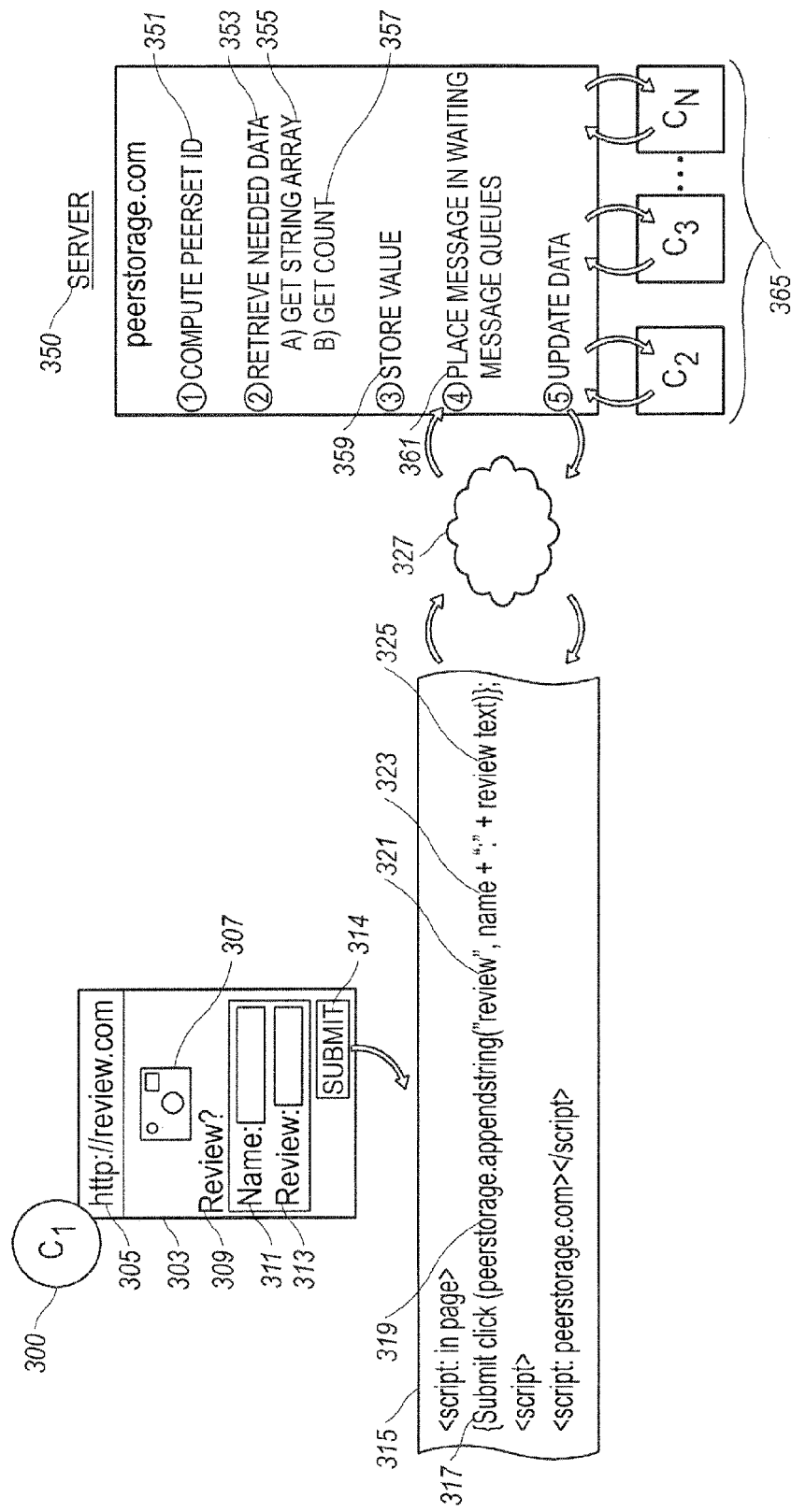
FIG. 3 illustrates a flow diagram of a non-limiting example of managing a shared storage medium, in accordance with an embodiment where the shared storage medium is associated with a product review website.

FIG. 3 illustrates at client device 300 communicatively coupled to a server 350 associated with a shared storage medium (not shown). The client device 300 and the server 350 can be similar to the client device 200 and the server 221 illustrated in FIG. 2. As illustrated in FIG. 3, the client device 300 and the server 350 are communicatively coupled to one another. For example, the client device 300 and the server 350 can be communicatively coupled via a network 327, such as the internet, similar to the network 204 illustrated in FIG. 2.

In FIG. 3, the client device 300 has retrieved the publisher's content corresponding to the website 305 review.com from the server 350 that is associated with the content provider or publisher of the website 305, for example, a backend server 350 associated with the website 305. After retrieving the publisher's content corresponding to the website 305, the client device 300 can render the publisher's content and the client-side script included therein in a browser 303 of the client device 300. In response to rendering the publisher's content, the graphical and textual data associated with the website 305 can be rendered. For example, as illustrated in FIG. 3, an image 307 of a product (for example, a camera) can be rendered in the browser 303 of the client device 300. Also illustrated in FIG. 3 is text data 309. The text data 309 can include one or more reviews related to the camera product illustrated in FIG. 3. In other implementations, the image data and text data can be other than those illustrated in FIG. 3, for example, articles, text, photos, graphics, visual or audio media files, columns of text, or any other information which can be represented graphically, audibly, or textually.

In the particular embodiment illustrated in FIG. 3, the text data 309 that is a review and can include a portion in which the user of the client device 300 can modify the data associated with the website 305. For example, the text data 309 associated with the review can include input fields 311, 313 by which the user of the client device 300 can modify the data associated with the website 305. The fields 311, 313 can be text-entry fields, fillable form fields, drop-down lists, selectable options (for example, radio buttons, check boxes, toggle buttons, etc.), or any other input field by which the user of the client device 300 can modify the data associated with the website 305. In FIG. 3, the website 305 includes input fields that are text-entry fields, specifically a name field 311 and a review field 313. The name field 311 and the review field 313 can allow the user of the client device 300 to submit a review of the product displayed on the webpage 305, such as a camera, as illustrated in FIG. 3.

In FIG. 3, if the user of the client device 300 desires to modify the data associated with the website 305, the user can enter the user's name in the name field 311 and the user's review of the camera product in the review field 313. The user can enter such data via a user input device (not shown) of the client device 300. For example, the user input device can be a keyboard, a touchscreen, an auxiliary input device (such as a mouse, trackball, jogball, trackpad, stylus, etc.), a microphone for voice commands, a camera for motion commands, gaze tracking, or both motion commands and gaze tracking, or any other user input device by which commands and inputs can be entered by the user of the client device 300. After the user completes at least one of the name field 311 and the review field 313, the user can submit the user's review by selecting a submit button 314 rendered on the website 305.

In response to selecting the submit button 314, client-side script 315 associated with the selection of the submit button 314 can be rendered, for example, by one or more processors or processing systems communicatively coupled to the client device 300. In FIG. 3, in response to selecting the submit button 314, the client-side script 315 can render the command:

Submit click (peerstorage.appendstring("review", name+":"+review text))

In such a command, the term "peerstorage" can signify a destination or the recipient of the command. In FIG. 3, the term "peerstorage" can indicate that the server 350 will receive the data submitted by the user's selection of the submit button 314. For example, the server 350 can be a server named "peerstorage" or a shared storage medium named "peerstorage" that is communicatively coupled to the server 350. The term "appendstring" can signify an operation that the server 350 can execute. For example, in FIG. 3, the appendstring operation can signify that a data string associated with the website 305 and stored at the server 350 should be appended with the data included in the parentheses of the command (in this example, 'review', name+':'+review text"). The term "review" 321 can signify which data associated with the website 305 to render. For example, the term "review" 321 can identify a string array to be modified with the information inputted by the user of the client device 300. The "name" 323 can include the text or data inputted by the user in the name field 311. The "review text" 325 can include the text or data inputted by the user in the review field 313 of the website. As illustrated in FIG. 3, a ":" separates the name 323 and the review text 325, for example, to indicate that the name and the review text are to be separated by a ":" when the data associated with the website 305 is modified or when the modified data associated with the website 305 is rendered on a browser 303 of a client device 300.

In FIG. 3, when the submit button has been selected and the client-side script 315 is rendered, the one or more processors or processing systems communicatively coupled to the client device 300 can render a script key ("peerstorage.com" as illustrated in FIG. 3) of the client-side script 315. For example, the script key "peerstorage.com" can be rendered similarly as the script key 211 "peerstore" is rendered illustrated in FIG. 2. For example, when the client device 300 renders the script key "peerstorage.com" of the client-side script 315, the client device 300 can transmit information to the server 350 from which the server 350 can compute a peerset name to associate with the client device 200. For example, the information can include site data, a browser ID, and a type, similar to those described in relation to FIG. 2. The server 350 can then receive the information from the client device 300. In response to receiving the information, the server 350 can compute 351 a peerset name associated with the client device 200 based on the transmitted information 215, 217, 219. In one embodiment, the server 221 can compute a peerset name or ID based at least in part on the site 215 and the type 219 information transmitted by the client device 200.

Based on the computed peerset name 351, the server 350 can determine whether a peerset of the shared storage medium has already been created with the computed peerset name. If a peerset has not been created with the peerset name computed the server 350, the server 350 can create a peerset, similarly as discussed in FIG. 2. If however, a peerset has been created having the computed peerset name, the server 350 can retrieve 353 the corresponding peerset, any message queues associated with the peerset, and any data associated with the peerset partition. For example, in FIG. 3, the server 350 has determined that a peerset already exists having the computed peerset name 351 by the server 350. In response to this determination, the server 350 can retrieve 353 the data necessary to execute the operation of the command 317 rendered by the client-side script 315. In FIG. 3, the server 350 can retrieve 353 the string array 355 "review" identified in the command 317 rendered by the client side script 315. The string array 355 can include one or more of the reviews for the product 307 that the user of the client device 300 reviewed. In other embodiments, the string array 355 can include one or more new reviews submitted at substantially the same time that the user of the client device 300 submitted the user's review, one or more reviews submitted on the same day as the user of the client device 300 submitted the user's review, one or more reviews submitted within a predetermined time period from the time that the user of the client device 300 submitted the user's review, or all reviews submitted prior to the user of the client device's 300 submission of the user's review. By retrieving the string array 355, the server 350 can then modify the string array with the user's review.

Also illustrated in FIG. 3, the server 350 can retrieve a count 357 associated with the string array 355. The count 357 can be an integer, a time stamp, or any other value that indicates an order in which data should be appended to the string array or an order in which the string array should be modified. For example, in FIG. 3, the count 357 retrieved by the server 350 can indicate the number or count value assigned to the last or most recently submitted review received by the server 350. Then, based on the count 357 retrieved by the server 350, the server 350 can assign a count value to the review submitted by the client device 300. The count value assigned to the review submitted by the client device 300 can be the next sequential value (for example, the next sequential integer) from the last or most recently submitted review submitted prior to the review submitted by the client device 300. For example, the information associated with the review ("'review', name+':'+review text") transmitted by the client device 300 to the server 350 can be assigned a count value by appending the information associated with the review with the count value.

For example, if the last or most recent review submitted to the server 350 prior to the review submitted by the client device 300 has a count value of "7," the server can assign the review 325 submitted by the user of the client device 300 a count value of "8" indicating that seven other reviews had been submitted prior to the review by client device 300. In one embodiment, the seven other reviews can be previously-submitted reviews that were already appended to the string array 355 and transmitted to all other client devices 300, 365 rendering the website 305 associated with the review. In such an embodiment, the client device 300 can have already rendered the website 305 and displayed at least some of the seven previously-submitted reviews. The review 325 submitted by the client device 300 can then be assigned the count value of "8" if no other review had been submitted from the time that the client device 300 rendered the website 305 that included the seven previously-submitted reviews. While FIG. 3 illustrates that the server 350 assigns the count value to the information submitted by the client 300, those of ordinary skill in the art will appreciate that the client device 300 can assign the count value when rendering the client-side script 315 of the website 315. However, where another client device submits a review at substantially the same time that the client device 300 submits a review, allowing the server 350 to assign the count value can be beneficial.

For example, if another client device 365 submits a review at substantially the same time as the client device 300 (for example, 0.5 seconds or any time immediately before the server 350 receives the review from the client device 300), the client device 300 will not have rendered the review of the other client device 365, and the client device 300 will view its review as the eighth review. If the client device 300 assigns the count value to the review itself (for example, a count value of "8" if seven reviews were previously-submitted and rendered on the web browser 303 of the client device 300), the client device 300 may not receive the review of the other client device 365, as the review from the other client device 365 can also have a count value of "8," and the client device 300 can render the reviews having count values that are smaller or less than the count value of the client device's 300 review and larger or more than the count value of the client device's 300 review. That is, in such an example, both the review of the client device 300 and the other client device 365 can have count values of "8," and the client device 300 can view the client device's 300 own count value as the true count value and disregard the count value and review of the other client device 365. To address such a situation, the server 350 can assign the count value for each review received from the client devices 300, 365. By allowing the server 350 to assign the count values, the client devices 300, 365 that receive data from the peersets or partitions associated with the server 350 can take the count values stored, assigned, or both stored and assigned by the server 350 as the true count values, thereby accounting for latency situations such as the one described above. That is, as the server 350 receives the data from the client devices 300, 365 to update the data (for example, string arrays) of the peersets or partitions, the server 350 can better determine in which order the reviews should be appended to the string array or in which order the string array should be modified than the individual client devices 300, 365 can. For example, in the example where another client device 365 submits a review at substantially the same time as the client device 300 (for example, 0.5 seconds before the server 350 receives the review from the client device 300) and there are seven previously-submitted, the server 350 can assign the review from the other client device 365 a count value of "8" and the review from the client device 300 a count value of "9."

After the server 350 assigns the count values to the data (for, example the data for the reviews), the server can store 359 the data along with the assigned count values in the peerset having the computed peerset name 351. That is, the server 350 can store the data along with the count values in the partition corresponding with the computed peerset name 351. By assigning count values to the data stored in the peerset, client devices 300, 365 that visit the website 305 and receive the data from the peerset associated with the website 305 can receive the most recent, up-to-date, and complete data associated with the website 305. Additionally, as count values can be associated with the data, the client devices 300, 365 can render the content of the website 305 which can include the data stored in the peerset in the appropriate order that the data was received at the server 350.

In another embodiment, where a plurality of client devices 300, 365 are receiving and rendering content from the website 305 at substantially the same time, the server 350 can transmit updated data associated with the peerset corresponding to the website 305 to each of the client devices 300, 365. For example, the client devices 300, 365 who, when registering with the server 350, transmit information from which the server 350 computes a peerset name corresponding to the peerset associated with the website 350 (for example, review.com_domain), those client devices 300, 365 will have the same peerset names and will therefore be listening for, receiving, or waiting for data from the same peerset corresponding to the computed peerset name. Thus, when data associated with the peerset is modified or updated and the server 350 stores the modified or updated data and their corresponding count values, the server 350 can then place a message 361 containing the updated data in the message queues (similar to those discussed in FIG. 2) for each of the client devices 300, 365 listening for, receiving, or waiting for updated content from the website 305.

For example, in FIG. 3, when the peerset corresponding to the website 305 is updated with the data and count value for the review submitted by the client device 300, a message indicating that the data stored in the peerset has been updated or modified can be placed in each of the message queues associated with client devices 300, 365 listening for, receiving, or waiting for updated content from that peerset. Thus, when the client devices 300, 365 render script that transmit a data check or a status update to the server 350, the server 350 can transmit the updated data to each of the client devices 300, 365 listening for, receiving, or waiting for updated content from the website 305 that requested the data check or status update. For example, any client devices 300, 365 for which the sever 350 has computed the same peerset name (for example, any client devices 300, 365 that transmit information to the server 350 from which the server 350 computes a same peerset name for each for each of the client devices 300, 365).

As discussed with respect to FIG. 2, each client device 300, 365 has its own respective message queue. Thus, some client devices 300, 365 may not receive the all the data updates as other client devices 365. For example, a client device, who already has seven previously-submitted reviews for the website 305 rendered in its web browser 303 but has three new reviews (for example, an eight review, a ninth review, and a tenth review) placed in its message queue, will receive the three new reviews in response to a requested data check or status update. Whereas, another client device who is rendering the website 305 for a first time but rendering the website 305 just prior to the submission of the tenth review, that client device will have only the tenth review placed in its message queue but not the eighth and ninth review, as the eighth and ninth review will be transmitted to and rendered in the web browser of that client device when the client device registers itself with the server 350. Nevertheless, as the server 350 can assign count values to each data received in association with the peerset shared by a plurality of client devices 300, 366, each of the client devices 300, 365 will receive any updated data in the same order, thereby guarding against any latency problems associated with data that may be received at substantially the same time. Additionally, as such data checks and modifications to data are executed in response to the client device's 300, 365 rendering of client-side script, little to no interaction from the publisher of the content (for example, the website 305) is needed. The publisher can generate the client-side script and include a script key to initiate a process for creating a peerset or updating a peerset at the backend server (for example, server 350) rather than generating a database for each client device accessing the publisher's content.

Although not illustrated in FIGS. 2-3, those of ordinary skill in the art will appreciate that the data stored in the peersets can be deleted, purged, archived, or any combination thereof, based on the count values assigned to the data. For example, a predetermined count value can indicate a predetermined threshold of data that should remain in the peerset. For example, in an embodiment where the count values are time stamps, the predetermined count value can be a date, a time, a date range. Based on this predetermined count value, the server can delete data having count values that are older or less recent than the predetermined count value. For example, data having count values with dates older than the date identified in the predetermined count value.

In another embodiment, where the count values are integers, the predetermined count value can include a threshold integer and a trigger integer. The trigger integer can indicate when the server should delete data from the peerset. For example, the trigger integer can be the integer 100. Thus, then the partition assigns a datum of the partition with a count value of 100, the server can execute an operation to delete at least some of the data in the peerset. The threshold integer can indicate which data should be deleted when the trigger integer is met. For example, the threshold integer can be a minimum integer indicating that data having count values that are smaller or less than the threshold integer should be deleted. That is, in such an embodiment, data can be assigned increasing integers the more recently the data is added to the peerset. Thus, data having count values that are smaller integers can be considered as older or less recent data. Then, when the trigger integer is met, the data having count values smaller or less than the threshold integer (and thus, data that is older or less recent) can be deleted from the peerset.

In other embodiments, the count value threshold can indicate a maximum number of data to be stored in the peerset. Thus, when the count value threshold is met, the partition can be purged of at least some or all of the data stored in the peerset, thereby creating or freeing up space in the peerset for new data.

Figure 4:
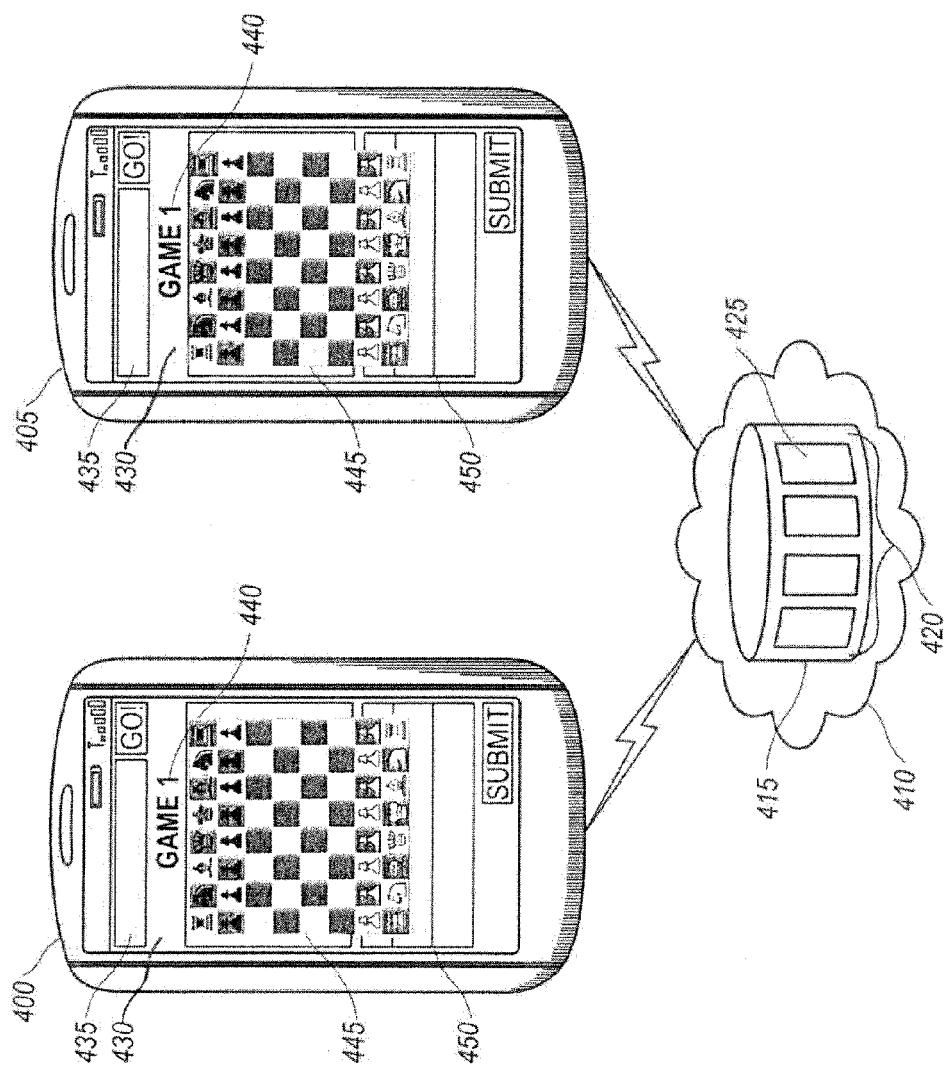
FIG. 4 illustrates a non-limiting example of retrieving content from a shared storage medium, in accordance with an embodiment where the shared storage medium is associated with a web-based game.
Figure 5:
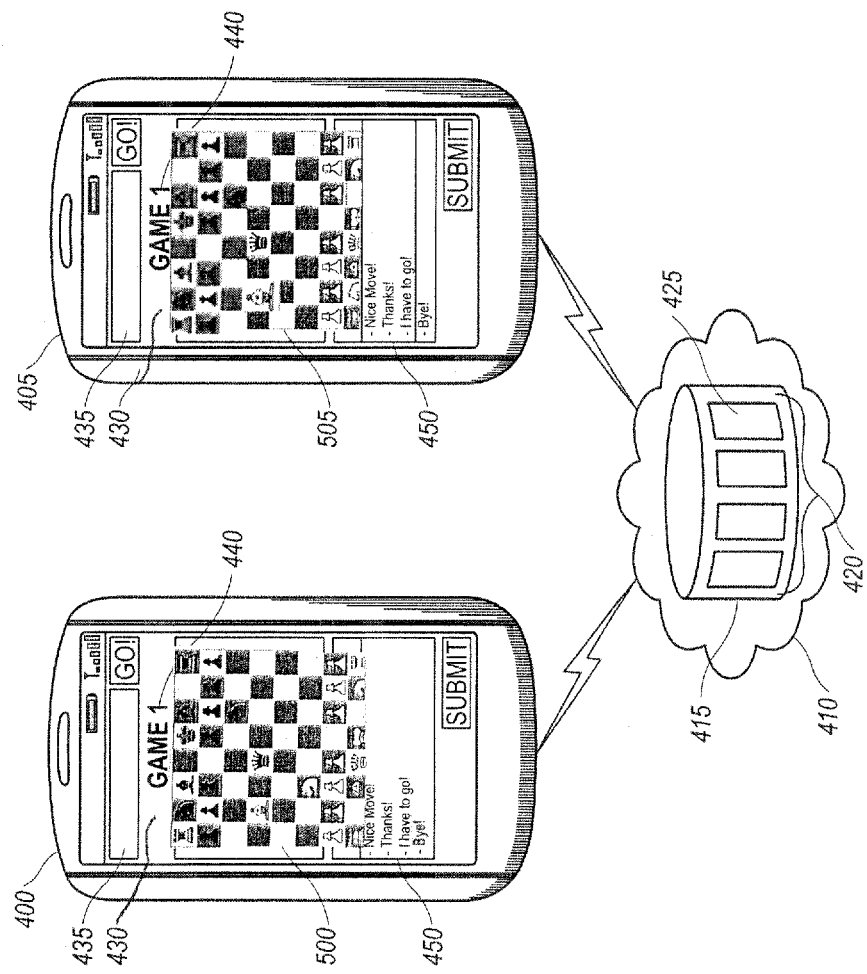
FIG. 5 illustrates a non-limiting example of transmitting modifications to the content to the shared storage medium associated with the web-based game illustrated in FIG. 4.
Figure 6:
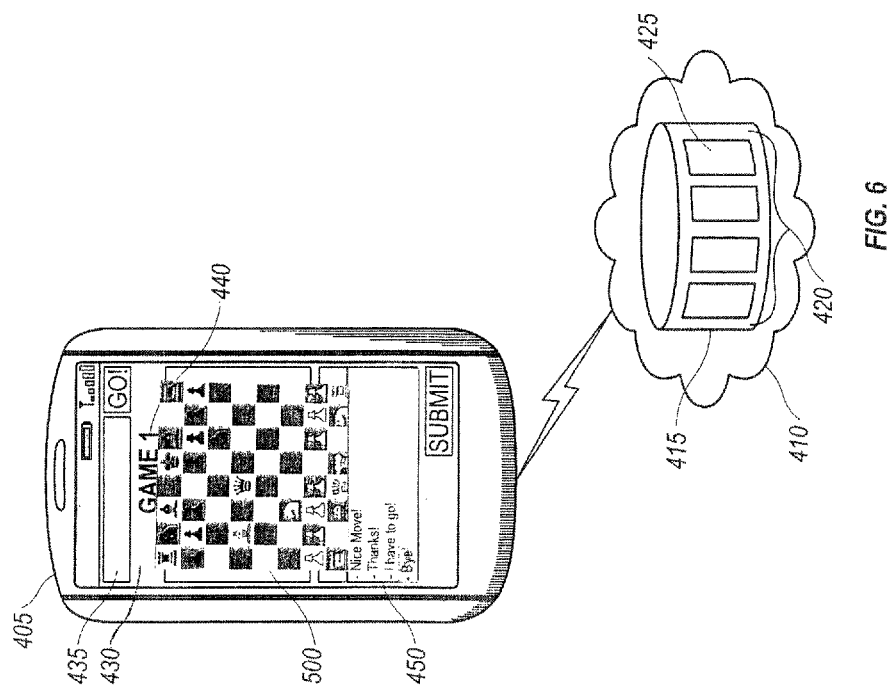
FIG. 6 illustrates a non-limiting example of retrieving the modified content illustrated in FIG. 5, at a later time, from the shared storage medium associated with the web-based game.

FIGS. 4-6 illustrate another example embodiment of the present technology, where the publisher's content is a web-based chess game application 430 which is stored or associated with a shared storage medium. However, those of ordinary skill in the art will however appreciate that the content can be a web-based chat, an HTML document, a web page, or any other content as described above. In FIGS. 4-6, the shared storage medium 415 is stored in a cloud database 410 and is partitioned into a plurality of partitions or peersets 420.

In FIG. 4, two client devices 400, 405 have requested access to the content (for example, the web-based chess game) having client-side script associated therewith from a server (not shown) (for example, a webserver). The client devices 400, 405 are both smartphones but can be any other client device. Additionally, the client devices 400, 405 can be of different types from one another. The client devices 400, 405 can be remote from one another but can access the same web-based chess game by visiting a website of the publisher. The client devices 400, 405 can request the publisher's content (such as the publisher's website), and thus the web-based chess game similarly as described in relation to FIG. 2. For example, the client devices 400, 405 can request the publisher's content from the webserver, receive the publisher's content, and render the content.

In FIG. 4, the client devices 400, 405 have rendered the publisher's content retrieved from the webserver. As illustrate in FIG. 4, the publisher's content 430 includes a chess game 450, an input field 435, and a chat field 450. The input field 435 can be a text-entry field, a pull-down list, a selectable list, or any other input field 435 by which a user can enter a name of a game the user desires to retrieve or a name which the user desires to assign to the chess-game rendered on the user's client device. For example, if the user is returning to the publisher's website and had previously played and saved a prior chess game in a peerset associated with the publisher's content, by entering a secret word, the peerset name associated with the peerset in which the prior chess game was stored, or any other information by which the backend server can identify the peerset in which the prior chess game was stored, as will be described below. If however, a new chess game is initiated for the client devices 400, 405, the client devices 400, 405 can each register themselves with the backend server associated with the publisher's content, similarly as the client device 200 registered itself in FIG. 2.

For example, the publisher's content can include client-side script that includes a script key that when rendered at the client device 400, 405, initiates a process at the backend server to create at least one of a peerset associated with the client device or a message queue associated with the client device, as described above. For example, when the client-side script associated of the publisher's content is rendered at the client devices 400, 405, and when the script key is rendered, information can be transmitted from the client device 400, 405 to a backend server having a shared storage medium that includes a peerset 425 associated with the publisher's content to register the client device 400, 405 with the backend server. Such information can be similar to that discussed in FIG. 2. That is, the information transmitted by the client devices 400, 405 to the backend server in response to rendering the script key of the client-side script can be information from which the backend server can compute a peerset name to determine whether a peerset exists having the computed peerset name. For example, in FIG. 4, the information can include a site, a browser ID, and a type. As discussed above, the type can be a domain type, a geo-subnet type, an internet protocol (IP) type, a secret word type (for example, a character string designated by the publisher or a character string, designated by the user accessing the content 203 in response to a prompt from the publisher), a geo-location type, a network address type, a geo-IP type, or any other type by which the publisher of the content 430 desires to have the backend server identify the peerset 425 associated with the client devices 400, 405 chess game.

For example, in FIG. 4, the users of the client devices 400, 405 can enter a character string in the input field 435. If a character string is entered in the input field 435, the character string can be transmitted to the backend server along with a secret word type (for example, if the publisher writes the client script to indicate that inputs entered the input field 435 are a secret word type). If, however, no input is entered in the input field 435, when the client deices 400, 405 register themselves with the backend server, the backend server can compute a default peerset name, similar to the peerset name computation discussed in FIG. 2.

In FIG. 4, as a character string has been entered in the input field 435, the client devices 400, 450 can transmit, to the backend server, the character string along with the other information from which the backend server can compute a peerset name. Then, based on the information received from the client device 400, 405, the backend server can compute a peerset name using the character string. As the peerset name can be associated with the secret word type, the peerset assigned to the computed peerset name will be accessible only to those client devices that input the character string in the input field 435. For example, in FIG. 4, the client devices 400, 405 have each inputted the character string "GAME 1" in the input field. Thus, when the client devices 400, 405 execute the client-side script and script key to register the client devices 400, 405 with the backend server, the information transmitted by the client devices 400, 405 to the server will include at least the character string "GAME 1" and a type indicated as being a secret word type. Based on this information, the backend server can compute a peerset name including the character string "GAME 1." The backend server can then determine whether a peerset 420 has already been associated with the computed peerset name for the character string "GAME 1." If a peerset 420 has already been associated with the peerset name include the character string "GAME 1," the backend server can send the data contained in the peerset 425 associated with the peerset name including character string "GAME 1" to each of the client devices 400, 405. If however, the backend server determines that a peerset has not been associated with the peerset name including the character string "GAME 1," the backend server can create a peerset 425, associate the created peerset 625 with the peerset name including the character string "GAME 1." The backend server can then transmit empty data to the each of the client devices 400, 405.

Additionally, as discussed above in relation to FIG. 2, the backend server can create message queues for each of the client devices 400, 405. As discussed above, the message queues can include any updates or modification to the peerset 625 associated with the peerset name including the character string "GAME 1".

FIG. 4 illustrates an embodiment where the backend server creates a new peerset to associate with the peerset name including the character string "GAME 1." When each of the client devices 400, 405 receive the empty data and render the empty data, the empty data can be stored in a respective browser storage (not shown). As illustrated in FIG. 4, when the publisher's content (for example, publisher's website) is rendered at the client devices 400, 450 and the data from the peerset 425 associated with the peerset name including the character string "GAME 1" is transmitted to the client devices 400, 405, the web browsers of the client devices 400, 405 can display a new chess game 445, in which all the chess pieces are positioned in a starting arrangement. That is, the chess pieces are arranged such that no chess moves have been made. Also illustrated in FIG. 4, the chess game 445 can also include a title 440 of the game. In FIG. 4, the title 440 is "GAME 1." The title 440 can correspond to the character string entered by the client devices 400, 450 in the input field 435. In other embodiments, the title 440 can correspond to the peerset name computed by the backend server. If no character string or input was entered in the input field 435, the backend server can automatically generate a title, such as a default title, or provide no title with the chess game 445.

With the web-based chess game rendered on the client devices 400, 405 and the data from the peerset 425 associated with the peerset name including the character string "GAME 1" transmitted to the client devices 400, 405, the users of the client devices 400, 405 can then modify the data associated with the publisher's website 430 by carrying out events, such as chess moves, chat dialogue, or any other interaction with the publisher's website 430. For example, as illustrated in FIG. 5, the users of the client devices 400, 405 can interact with the web-based chess game. For example, the client device 405 can be the first player, and the other client device 400 can be the second player. Each chess move made by the first player 405 or the second player 400 can be transmitted to the backend server in response to rendering the respective client-side scripts running on the client devices of the first player 405 and the second player 400. The data corresponding to the chess moves can be placed in the respective message queues of the first player 405 and the second player 400. Therefore, when the client devices of the first player 405 and the second player 400 render the client-sides script that initiates a data check call or a status update request at the backend server, the client devices of the first player 405 and the second player 400 will receive the data associated with the chess moves and render the publisher's website at the first player 405 and the second player's 400 respective devices.

For example, in FIG. 5, the first player 405 and the second player 400 can interact with the publisher's website by inputting chess moves. Specifically, in FIG. 5, the first player 405 (in FIG. 5, the black chess pieces) has made a chess move 505 to move the knight chess piece. Data corresponding to this chess move 505 can be transmitted to the server, in response to the client device of the first player 405 rendering the client-side script and rendering a script key to update the data associated with the peerset 425 associated with the first player's 405 chess game. The data corresponding to the first player's 405 chess move 505 will then be placed in the message queue of the second player 400. The data corresponding to the first player's 405 chess move 505 can also be placed in message queues of any other client device accessing the first player's 405 and second player's chess 400 game. That is, any other client whose information when transmitted to the backend server cause the backend server to generate the peerset name associated with the peerset 425 of the first player's 405 and the second player's 400 chess game. In FIG. 5, when the data corresponding to the first player's 405 chess move 505 is placed in the message queue of the second player 400, the backend server can send the data in the message queue of the second player 400 to the client device of the second player 400, and the chess board displayed on the second player's 400 client device can be updated to include the first player's chess move 505.

Also in FIG. 5, the first player 405 and the second player 400 can input chat messages in the chat section 450. For example, the chat section 450 in both the client devices of the first player 405 and the second player 400 can include a conversation including the messages "Nice move!," "Thanks!," and "I have to go!" However, in FIG. 5, the first player 405 can input a reply message "Bye!" at the first player's 405 client device. For example, the first player 405 can input the reply message by using an input interface (such as a voice command interface). Data corresponding to the reply message "Bye!" can be transmitted to the backend server. The backend server can then place the data corresponding to the reply message "Bye!" in the message queues of any client device listening for or receiving updates associated with the peerset corresponding to the first player's 405 chess game (for example, the message queue of the second player 400). When the data corresponding to the reply message "Bye!" is placed in the second player's message queue, the backend server can transmit the data to the second player's 400 client device. For example, the backend server can transmit the data to the second player's 400 client device in response to the second player's 400 client device rendering client-side script corresponding to a data check call or a status update request. When the data corresponding to the reply message "Bye!" is transmitted to the second player's 400 client device, the second player's 400 client device can render the data and display the reply message "Bye!" in the chat section 450, as illustrated in FIG. 5.

In FIG. 5, the second player 400 (having the white chess pieces) has moved the knight chess piece at substantially the same time that the first player 405 inputted the reply message "Bye!" (for example, 1.0 s after the first player 405 inputted the reply message). Thus, as discussed above in relation to FIG. 3, when the backend server receives the data corresponding to the first player's 405 reply message, the backend server can assign a first count value to the data corresponding to the first player's 405 reply message. Similarly, when the backend server receives data corresponding to the second player's 400 chess move 500, the backend server can assign a second count value to the data corresponding to the second player's chess move 500. The first count value can be a lower integer than the second count value, thereby indicating that the data corresponding to the first player's 405 reply message should be rendered before the data corresponding to the second player's chess move 500. Thus, as illustrated in FIG. 5, the second player's 400 client device has rendered the reply message "Bye!," but the first player's device 405 has not yet rendered the second player's 400 chess move 500. If for example, the first player 405 leaves the chess game before the client device of the first player 405 receives the data corresponding to the second player's 400 chess move 500, the data can remain in the first player's 405 message queue, can be stored in the peerset 425 corresponding to the first player's game (for example, the peerset 425 having the peerset name including the character string "GAME 1"), or both. The first player 405 can leave the chess game by leaving the publisher's website 430, entering a second input in the input field 435 to retrieve a different chess game, exit the web browser executing on the first player's 405 client device, visit a website different from the publisher's website 430, or any other action or activity that directs the first player 405 away from the chess game.

In FIG. 5, the first player 405 has left the chess game having the title "GAME 1" before receiving the updated data including the second player's 400 chess move 500 from the backend server. However, at a time after the first player 405 has left the chess game, the first player 405 can return to the publisher's website 405 and retrieve the chess game titled "GAME 1," for example, as illustrated in FIG. 6. When the first player 405 retrieves the chess game titled "GAME 1," the chess game will have the most recent chess move received or stored in the peerset 425 corresponding to the chess game "GAME 1."

For example, in FIG. 6, the first player 405 has executed a browser application on the client device of the first player 405 and requested the publisher's content from a webserver. After retrieving and rendering the publisher's content (for example, the publisher's website) and rendering the client-side script associated with the publisher's content, the first player can input the character string "GAME 1" in the input field 435. The client-side script can then be rendered to execute a submit operation, similar to that discussed in FIG. 3, to submit information containing the character string "GAME 1" to the backend server associated with the publisher's content. For example, the backend server can receive information from the first player's 405 client device that includes the character string "GAME 1" and a secret word type. The backend server can then compute a peerset name including the character string "GAME 1." The backend server can then determine whether a peerset 420 in the shared storage medium 415 corresponds to the computed peerset name. As the shared storage medium 415 has a dedicated peerset 425 corresponding to the peerset name including the character string "GAME 1," the backend server can transmit at least some, including all, all the data stored in the dedicated peerset 425 corresponding to the peerset name including the character string "GAME."

In FIG. 6, the client device of the first player 405 has received the data from the backend server, stored the data in a browser storage of the client device of the first player 405 and has rendered the data in the browser application of the client device of the first player 405. As illustrated in FIG. 6, the rendered publisher's content includes the chess game having the chess move submitted by the second player 400 in FIG. 5. The rendered publisher's content also includes the chat section 450 including the last conversation submitted to and stored by the backend server. Specifically, the last conversation includes the "Bye!" message submitted by the first player 405 in FIG. 5. Comparing the publisher's content rendered on the client device of the first player 405 in FIG. 5 to the publisher's content rendered on the client device of the first player 405 in FIG. 6, the rendered publisher's content displays the first player's 405 "Bye!" message and the second player's 400 chess move 500. As the backend server assigns count values to data received from client devices listening for and updating data, the browser of the client device of the first player 400 can render the data associated with the publisher's content in an order determined by the count values, thereby protecting against latent data that may have been received by the backend server and data that may have been received substantially simultaneously with one another. As the first player 405 will recognize that the last chess move 500 is not the same as the chess move 505 that was rendered in the browser of the first player's 45 client device when the first player 405 exited the chess game, the first player 405 can determine that the second player (or any other client device that may have accessed the chess game after the first player 405 left the chess game) modified the chess game by adding another chess move. For example, in FIG. 6, the first player 405 can determine that the second player 400 moved the white knight chess piece after the first player 405 exited the game.

In other embodiments, other client devices (for example, other client devices different from those of the first player 405 and the second player 400) can access the chess game stored in the peerset 425 having the peerset name including the character string "GAME 1" and can modify the data (for example, by adding more chess moves, adding more chat conversations, or both) before the first player 405 returns to the chess game. In such embodiments, the backend server can store the modifications and updates made by the other client devices. Then, when the first player 405 requests and receives the data associated with the chess game titled "GAME 1," the data would include the other client devices' modifications and updates. That is, when the data received from the backend server is rendered in the web browser of the first player's 405 client device, the chess game would display the chess moves added by the other client devices.

After the first player 405 renders the publisher's content 430 as illustrated in FIG. 6, the first player 405 can continue to interact and update the publisher's content (for example, by adding more chess moves, adding more chat messages, or both), even if the second player 400 is not accessing the chess game titled "GAME 1" at the same time as the first player 405. The first player's modifications and updates to the publisher's content can then be transmitted to the backend server, placed in the message queues of any other client devices waiting for updates to the peerset 425 associated with the chess game titled "GAME 1," and stored in the peerset 425.

Thus, any time any client device submits information (for example, a site, a browser ID, a type, or any other similar information) in response to rendering client-side script that includes a script key that initiates a process for creating or retrieving a peerset from a backend server, the backend server can compute a peerset name from the submitted information, create a peerset or retrieve a peerset having the computed peerset name, and transmit any data stored in that peerset to the client device. As the backend server stores any updated data or modifications to the data stored in the peerset and as the backend server assigns count values to the received data, when any client device receives the data associated with the peerset, the client device can receive the most recent state of the data.

Although FIG. 6 illustrates the first player 405 rendering the publisher's content 430 on the same client device that the first player 405 used before the first player 405 left the publisher's content, those of ordinary skill in the art will appreciate that the first player 405 can request and render the publisher's content 430 at a different client device. For example, the first player 405 can initiate the chess game on a smartphone client device, as illustrated in FIGS. 4 and 5, but at a later time, when the first player 405 returns to the chess game 430, the first player 405 can retrieve the chess game 405 from his personal home computer.

Also, while the embodiment illustrated in FIGS. 4-6 illustrate publisher's content that is a web-based chess game, those of ordinary skill in the art will appreciate that the publisher's content can be a web-based chat, a server-based chat, social media content, content associated with a dynamic webpage, a web-based media playback application, a message board, an e-commerce webpage, a crowd-sourced webpage, a server-based media-playback application, or any other content which may be updated and retrieved at a later time.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of datastores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (for example, a mouse, keyboard, controller, touch screen, or keypad), and at least one output device (for example, a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (for example, a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for managing a shared storage medium having at least one partition, the method comprising:
    receiving information from a client device executing a client-side script, the client-side script associated with a network site, the information comprising at least a unique identification corresponding to the client device;
    computing a partition name based at least in part on the information received from the client device;
    determining whether a partition of the shared storage medium is associated with the partition name computed based at least in part on the information received from the client device;
    in response to determining that the partition of the shared storage medium is associated with the computed partition name, transmitting data stored in the partition to the client device;
    in response to determining that no partition of the shared storage medium is associated with the computed partition name, creating the partition using at least the client-side script and associating the computed partition name therewith;
    receiving updates to the data stored in the partition associated with the partition name;
    computing a client device identifier based at least in part on the information identifying the client device;
    determining whether a message queue corresponds to the identified client device; and
    placing a message corresponding to the updates in the message queue.

2. The computer-implemented method of claim 1, wherein the information received from the client device comprises one or more of a domain name, a uniform resource locator (URL), or a password.

3. The computer-implemented method of claim 1, wherein the unique identification comprises a browser identification associated with a browser executing on the client device.

4. A computer-implemented method for managing a shared storage medium having at least one partition, the method comprising:
    receiving information from a client device executing a client-side script, the client-side script associated with a network site, the information comprising at least a unique identification corresponding to the client device;
    computing a partition name based at least in part on the information received from the client device;
    determining whether a partition of the shared storage medium is associated with the partition name computed based at least in part on the information received from the client device;
    in response to determining that the partition of the shared storage medium is associated with the computed partition name, transmitting data stored in the partition to the client device;
    in response to determining that no partition of the shared storage medium is associated with the computed partition name, creating the partition and associating the computed partition name therewith;
    computing a client device identifier based at least in part on the information received, the client device identifier comprising the unique identification and corresponding to the computed partition name;
    identifying a message queue associated with the computed partition name;
    determining whether the message queue associated with the computed partition name is associated with the client device identifier;
    in response to determining that the message queue is not associated with the client device identified, creating a dedicated message queue associated with the client device identifier and the computed partition name;
    updating data stored in the partition associated with the computed partition name;
    placing a message corresponding to the updated data in each of the message queue and the dedicated message queue associated with the computed partition name; and
    transmitting the message to the client device associated with the dedicated message queue and to one or more other client devices associated with the message queue.

5. A computer-implemented method for managing content of a shared storage medium, the method comprising:
    receiving, from a client device, information associated with a client-side script executing on the client device, the information at least identifying the client device;
    determining whether a partition of the shared storage medium corresponds to the information identifying the client device;
    in response to determining that the partition of the shared storage medium corresponds to the information identifying the client device, transmitting data stored in the partition; and
    in response to determining that no partition of the shared storage medium corresponds to the information identifying the client device, creating the partition using at least the client-side script and associating the partition with the information identifying the client device;
    receiving updates to the data stored in the partition associated with the partition name;
    computing a client device identifier based at least in part on the information identifying the client device;
    determining whether a message queue corresponds to the identified client device; and
    placing a message corresponding to the updates in the message queue.

6. The computer-implemented method of claim 5, further comprising:

computing a partition name based on the information identifying the client device;

and wherein determining whether a partition of the shared storage medium is associated with the information identifying the client device comprises determining whether the partition of the shared storage medium is associated with the partition name computed.

7. The computer-implemented method of claim 6, further comprising creating a message queue associated with the client device and the partition associated with the partition name computed.

8. The computer-implemented method of claim 7, wherein the client device is a first client device, and the method further comprises:
receiving, from one or more second client devices, updates to the data stored in the partition; and
placing messages corresponding to the updates in the message queue associated with the first client device.

9. A computer-implemented method for managing content of a shared storage medium, the method comprising:
receiving, from a client device, information associated with a client-side script executing on the client device, the information at least identifying the client device;
determining whether a partition of the shared storage medium corresponds to the information identifying the client device;
in response to determining that the partition of the shared storage medium corresponds to the information identifying the client device, transmitting data stored in the partition;
in response to determining that no partition of the shared storage medium corresponds to the information identifying the client device, creating the partition and associating the partition with the information identifying the client device;
computing a partition name based on the information identifying the client device;
wherein determining whether a partition of the shared storage medium is associated with the information identifying the client device comprises determining whether the partition of the shared storage medium is associated with the partition name computed; and
wherein the information identifying the client device comprises a unique identifier corresponding to the client device, and the method further comprises:
receiving updates to the data stored in the partition associated with the partition name computed;
computing a client device identifier based at least in part on the information identifying the client device, the client device identifier comprising the unique identifier and corresponding to the partition name computed;
determining whether a message queue corresponds to the client device identifier computed; and
in response to determining that the message queue corresponds to the client device identifier, placing a message associated with the updates in the message queue.

10. The computer-implemented method of claim 9, wherein the client device is a first client device, and the method further comprises:
receiving, from at least one of the first client device or one or more second client devices,
updates to the data stored in the partition associated with the partition name computed;
determining whether a message queue corresponds to the partition name computed, the message queue being associated with any of the first client device and the one or more second client devices transmitting information corresponding to the partition name computed;
placing a message comprising the updates in the message queue corresponding to the partition name computed; and
transmitting the message comprising the updates to each of the first client device and the one or more second client devices associated with the message queue.

11. The computer-implemented method of claim 10, further comprising:
assigning a count value to each of the updates received, the count value corresponding to an order in which the updates are received.

12. The computer-implemented method of claim 11, wherein
the count value is at least one of an integer or a time stamp.

13. The computer-implemented method of claim 9,
further comprising:
assigning a count value to the data stored in the partition associated with the information identifying the client device, the count value corresponding to an order in which the data was stored in the partition; and
deleting data stored in the partition associated with the information identifying the client device based on the count value assigned to respective data.

14. A computer-implemented method for rendering dynamic data of published content stored on a shared storage medium, the method comprising:
receiving, at a browser, published content comprising a client-side script and a script key corresponding to dynamic data of the published content;
rendering, at the browser, the client-side script of the published content without creating a client-side database associated with the published content;
in response to rendering the script key of the client-side script, transmitting, to a server, information to determine a partition of the shared storage medium that corresponds to the dynamic data, wherein the information is associated with the published content and storing the dynamic data;
in response to determining that no partition of the shared storage medium corresponds to the dynamic data, creating the partition using at least the client-side script;
computing a client device identifier corresponding to the determined partition, based at least in part on the said received information;
creating a message queue corresponding to the created partition and the client device identifier;
receiving updates to the dynamic data stored in the created partition;
placing a message corresponding to the updates in the message queue; and
receiving, from the server, modified dynamic data of the published content based on the information transmitted.

15. The computer-implemented method of claim 14 further comprising:
updating, at the browser, the dynamic data of the published content based at least in part on the modified dynamic data; and
in response to updating the dynamic data, transmitting, to the server, the updated dynamic data and information with the published content and storing the dynamic data.

16. The computer-implemented method of claim 15, wherein the client-side script comprises a data check operation, and the method further comprises:
in response to rendering the data check operation, transmitting a request for the updated dynamic data associated with the published content and information to determine the partition associated with the published content and storing the dynamic data.

17. A system for managing content, the system comprising:
a processor; and
a memory device including instructions that, when executed by the processor, cause the system to:
   receive, from a client device, information associated with a client-side script of published content executing on the client device;
   determine whether a partition of a shared storage medium associated with the published content is associated with the information received;
   in response to determining that the partition of the shared storage medium is associated with the information received, transmit data stored in the partition; and
   in response to determining that no partition of the shared storage medium is associated with the information received, create the partition using at least the client-side script and associate the partition with the information received.

18. The system of claim 17, wherein the processor is further configured to execute instructions that cause the processor to:
   compute a partition name based on the information received,
   wherein determining whether a partition of the shared storage medium is associated with the information received comprises determining whether the partition of the shared storage medium corresponds to the partition name computed.

19. The system of claim 18, wherein the processor is further configured to execute instructions that cause the processor to:
   create a message queue associated with the client device and the partition associated with the computed partition name.

20. The system of claim 19, wherein the processor is further configured to execute instructions that cause the processor to:
   receive updates, from one or more second client devices, to the data stored in the partition; and
   place messages corresponding to the updates in the message queue.

21. A system for managing content, the system comprising:
a processor; and
a memory device including instructions that, when executed by the processor, cause the system to:
   receive, from a client device, information associated with a client-side script of published content executing on the client device;
   determine whether a partition of a shared storage medium associated with the published content is associated with the information received;
   in response to determining that the partition of the shared storage medium is associated with the information received, transmit data stored in the partition;
   in response to determining that no partition of the shared storage medium is associated with the information received, create the partition and associate the partition with the information received;
   compute a partition name based on the information received,
   wherein determining whether a partition of the shared storage medium is associated with the information received comprises determining whether the partition of the shared storage medium corresponds to the partition name computed;
   create a message queue associated with the client device and the partition associated with the computed partition name;
   receive updates, from one or more second client devices, to the data stored in the partition;
   place messages corresponding to the updates in the message queue;
   assign a count value to each of the updates received, the count value corresponding to an order in which the updates are received; and
   transmit, to the client device, updates corresponding to the messages in the message queue in an order based on the count value of the updates.

22. A non-transitory computer-readable storage medium storing instructions that, when executed by a processor of a computer system, cause the computer system to:
   receive, from a client device, information associated with a client-side script of published content executing on the client device;
   determine whether a partition of a shared storage medium associated with the published content is associated with the information received;
   in response to determining that the partition of the shared storage medium is associated with the information received, transmit data stored in the partition; and
   in response to determining that no partition of the shared storage medium is associated with the information received, create the partition using at least the client-side script and associating the partition with the information received;
   creating a message queue associated with the client device and the partition;
   receiving updates, from the one or more second client devices, to the data stored in the partition; and
   placing messages corresponding to the updates in the message queues.

23. The non-transitory computer-readable storage medium of claim 22, storing further instructions that, when executed by the processor of the computer system, cause the computer system to:
   compute a partition name based on the information received; and
   determine whether a partition of the shared storage medium is associated with the information received by determining whether the partition of the shared storage medium is associated with the computed partition name.

24. The non-transitory computer-readable storage medium of claim 22, storing further instructions that, when executed by the processor of the computer system, cause the computer system to:
   assign a count value to each of the data stored in the partition associated with the information received and to updates to the data stored in the partition, the count value corresponding to an order in which the data was stored or updated in the partition.

25. The non-transitory computer-readable storage medium of claim 22, storing further instructions that, when executed by the processor of the computer system, cause the computer system to:
   delete data stored in the partition based on the assigned count values.

* * * * *